(12) United States Patent
Armstrong et al.

(10) Patent No.: US 7,191,260 B2
(45) Date of Patent: Mar. 13, 2007

(54) MULTIPLE CONNECTION MANAGEMENT SYSTEM

(75) Inventors: Troy David Armstrong, Rochester, MN (US); Thomas Richard Crowley, Rochester, MN (US); Kenneth Gerald Linn, Rochester, MN (US); James Lee Naylor, Rochester, MN (US); Joseph Thomas Writz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 10/757,789

(22) Filed: Jan. 15, 2004

(65) Prior Publication Data

US 2005/0198369 A1  Sep. 8, 2005

(51) Int. Cl.
*G06F 13/00* (2006.01)

(52) U.S. Cl. .......................... 710/38; 710/316; 370/359

(58) Field of Classification Search .................... 710/2, 710/8–19, 36–43, 104–105, 187, 316–317; 370/351–379
See application file for complete search history.

(56) References Cited

U.S. PATENT DOCUMENTS

| 5,452,421 | A  | * | 9/1995 | Beardsley et al. | ............. 714/4 |
| 6,243,753 | B1 | * | 6/2001 | Machin et al. | ............. 709/227 |
| 6,704,812 | B2 | * | 3/2004 | Bakke et al. | ................. 710/38 |
| 2003/0017805 | A1 | * | 1/2003 | Yeung et al. | ................. 455/41 |
| 2003/0023895 | A1 | * | 1/2003 | Sinha et al. | .................... 714/5 |
| 2005/0091441 | A1 | * | 4/2005 | Qi et al. | ......................... 711/5 |
| 2006/0053223 | A1 | * | 3/2006 | Tucker et al. | ............... 709/227 |

* cited by examiner

*Primary Examiner*—Christopher Shin
(74) *Attorney, Agent, or Firm*—Wood, Herron & Evans, LLP

(57) ABSTRACT

An apparatus, program product and method for managing a number of physical connections to a peripheral device. A multipath driver provides a logical connection interface to a client. This interface allows the client to efficiently access the peripheral device over one or more of the physical connections. In so doing, the logical connection interface associates connections with a primary connection, deletes inactive connections from memory, as well as updates and uses a list of active connections to seamlessly route data to the peripheral device.

49 Claims, 4 Drawing Sheets

MULTIPLE CONNECTION MANAGEMENT SYSTEM

FIELD OF THE INVENTION

The present invention relates to computing systems, and more particularly, to computer software and hardware used to communicate between networked devices of computing systems.

BACKGROUND OF THE INVENTION

Effective computer operation requires the efficient reading and writing of data out to peripheral devices, such as storage disks. Fundamental to this read and write capability is the hardware connection that provides the physical pathway for communication with the peripheral device. Such a connection commonly comprises a fiber optic cable that couples to ports of both the computer and the peripheral device. As such, the cable comprises the communication link over which the read and write data is exchanged.

For performance and reliability considerations, computer systems have been developed that use a number of cables to connect two devices. For example, a computer may write and read: data to and from a single disk storage unit using five or more cables. In one respect, using multiple cables to connect the same computer devices bolsters reliability. In the event that should one or more of the cables become disconnected or otherwise inoperable, another connection ideally remains available. A larger number of cables also provides increased bandwidth, allowing for more efficient data exchanges.

Despite such processing and reliability advances, however, using redundant connections presents new challenges to computer performance. For example, existing systems are only configured to route data to a desired peripheral device using a single connection. The existing upper level programming of systems relies on the one-to-one relationship of a peripheral device to its respective cable connection in order to route data to the device. This is because the upper level programming sends a write/read command without regard to the connection. When writing data, for example, the upper level programs are configured only to "see" or otherwise process the address specific to the target disk unit.

With the advent of redundant connections, a computer having a number of connections to the same disk unit must account for the existence of each cable connection in order to successfully read and write data. The status of each cable, for instance, whether a cable is reporting or not, deleted, added, etc., must be known. Otherwise, failure to separately track each connection can cause data to be written or read to or from an inappropriate device. Such miscommunication will result in file corruption.

Furthermore, existing systems have relatively limited memory resources available to potentially store address, routing and other information pertaining to different communication paths. Accommodating multiple cable connections for each device must somehow not overburden available memory. Moreover, the time critical nature of computer processing requires that any routing scheme be sufficiently efficient to handle increasing workloads without delay.

Therefore, a significant need exists for an improved manner of managing connections between hardware devices and a computer system.

SUMMARY OF THE INVENTION

The invention addresses these and other problems associated with the prior art by providing an apparatus, program product and method of managing a number of physical connections to a peripheral device. An embodiment consistent with the invention includes a multipath driver that provides a logical connection interface. This interface allows a client to efficiently access the peripheral device over one or more of the physical connections. For instance, a client user or system may read and write data to the peripheral device without regard to which actual physical connection is used to route the data. Instead, that physical connection is automatically and transparently determined by the multipath driver.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
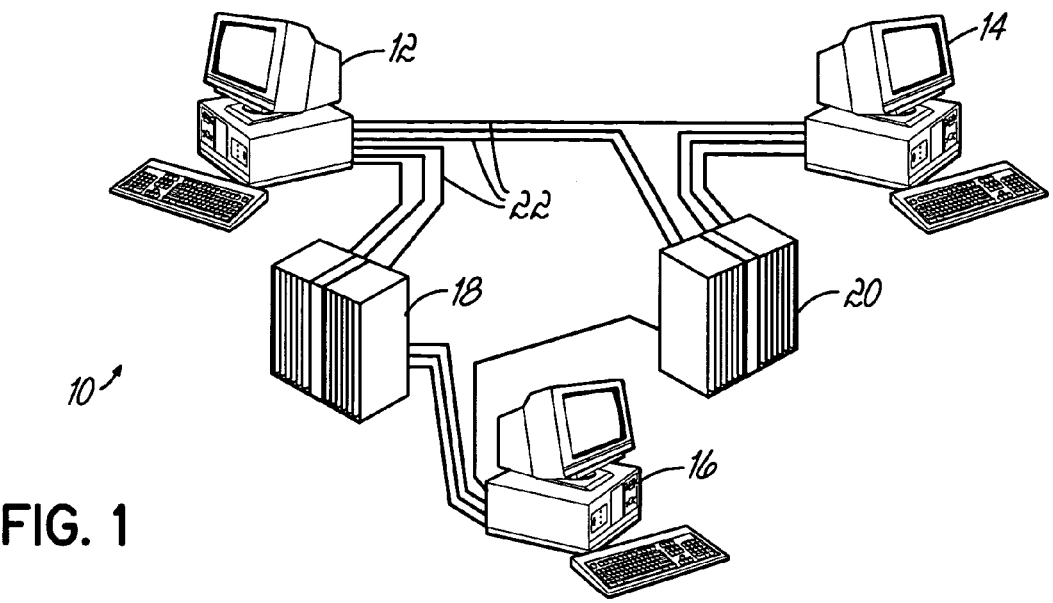
FIG. 1 is a block diagram of a computer system consistent with the invention.

The present invention provides an apparatus, program product and method of managing a number of physical connections to a peripheral device. An embodiment consistent with the invention includes a multipath driver that enables a client to efficiently access the peripheral device over one or more of the physical connections. The physical connection used to access the device is automatically and transparently determined by the multipath driver.

In one sense, a multipath driver comprises a logical interface layer between the client/upper level programming and logic associated with each connection. That is, a multipath driver may comprise a new layer that preserves the "one device" interface for current hardware and software implementations, while at the same time providing an interface that maintains information specific to the individual connections to the peripheral device. This allows the upper level programming to accomplish functions such as read, write, reset, read-parameters, etc., while focusing only on the "one view" of the peripheral device provided by the multipath driver. The client and other upper level programming thus remain unburdened by the actual physical connections.

By correlating multiple connections to a single peripheral device and allowing the connection to be treated as one entity, the multipath driver reduces the occurrence of data corruption. For instance, the multipath driver helps prevent the overlooking of a connection, or the improper association of a connection with a peripheral device. Also, additional connections may be added "on the fly" without requiring any shutdown/quiesce, etc.

To this end, the multipath driver may include a list that includes pointers to only those object fields associated with available or otherwise desirable connections. By keeping a separate list of just the active connections, storage space is saved. Moreover, the more concise list reduces processing time and power needed to locate an appropriate connection. The multipath device additionally handles connection failures by removing the failed connection from the list, and by determining an alternative connection to the peripheral device.

Of note, the transition to this alternative connection is accomplished seamlessly, or without any discernable delay to the client. Thus, computing operations remain uninterrupted in spite of the failed connection. These features of the active list and multipath driver thus avoid having to check the status of each device driver when determining a new route. These features also ensure an optimum number of retries and that all possible paths are tried. Deletion of failed connections from the list also frees up memory for other applications.

Furthermore, the multipath driver continuously updates connection information to mitigate occurrences of data corruption and processing delay. For example, as connections are added and deleted per system specifications, a corresponding logical connection is automatically established. Moreover, processes of the present invention minimize the use of memory by deleting data pertaining to undesired connections.

Turning to the Drawings, wherein like numbers denote like parts throughout the several views, FIG. 1 shows an exemplary computer system 10 configured to manage a number of physical connections 22 linking a computer 12 to a peripheral device 18. That is, the computer 12 of FIG. 1 couples to the peripheral device 18 using more than one cable or other connection. The system 10 manages these connections to enable efficient communication of computer commands and data. Such management includes data routing functions, as well as associating each of the connections 22 with a primary connection and/or a peripheral device 18 for client processing considerations.

To this end, the computer 12 of the system 10 is configured to support a multipath driver that provides a logical connection interface to client software. This interface allows the client to efficiently access the peripheral device 18 over one or more of the physical connections 22. In so doing, the logical connection/multipath interface of the computer 12 associates connections with a primary connection, while updating and using a list of active connections to seamlessly route data to the peripheral device 18. In one embodiment, inactive connections are deleted from memory.

As shown in FIG. 1, the system 10 includes a plurality of computers 12, 14 and 16 networked to each other and to peripheral devices 18 and 20. The exemplary peripheral devices of FIG. 1 include storage server logical units configured to both store and route data to and from networked computers 12, 14 and 16. Such storage server logical units include individually addressable disk units that each computer 12, 14 and 16 may read and write data from and to, respectively. An example of a server logical unit is an Enterprise Storage Server, such as is available from International Business Machines Corporation. Fiber optic cables 22 connect computers 12, 14 and 16 to the peripheral units 18 and 20.

While FIG. 1 shows peripheral units 18 and 20 as server logical units, one skilled in the art should appreciate that an alternative, suitable peripheral device may comprise other networked hardware devices. Moreover, while connections 22 shown in FIG. 1 include fiber optic cables, suitable connections of other embodiments consistent with the invention may include other communication devices, to include wireless transmission equipment.

Though not necessary for purposes of some embodiments consistent with the present invention, the system 10 of FIG. 1 supports clustering. Clustering generally refers to a computer system organization where multiple computers are networked together to cooperatively perform computer tasks. An important aspect of a computer cluster is that all of the computers in the cluster present a single image. Clustering is often used in relatively large, multi-user computer systems where high performance and reliability are of particular concern.

For example, clustering is used to increase overall performance, since multiple computers can handle a larger number of tasks in parallel than a single computer otherwise could. Often, load balancing can be used to ensure that tasks are distributed fairly among computers to prevent individual computers from becoming overloaded. Clustering may also be used to provide redundancy, or fault tolerance, so that should any computer or connection fail, the operations previously performed by that computer or connection will be handled by other computers or connections in the cluster.

In the specific context of FIG. 1, multiple connections 22 support communication between the clustered computer 12 and a peripheral unit 18 of the clustered system 10. As such, a number of connections 22 may comprise different communication paths to the computer 12 from the same disk unit of a server logical unit. These redundant connections 22 can provide improved system reliability and performance.

In one exemplary embodiment, computers 12, 14 and 16 are implemented as iSeries computers from International Business Machines Corporation, and operating system 40 is implemented as an appropriate operating system incorporating clustering capabilities, such as the OS/400 operating system also available from IBM. The general use and configuration of clustering services in the exemplary environment is well known to one of ordinary skills in the art.

It will be appreciated that the processes consistent with the present invention may be accomplished in systems other than those organized in a clustered configuration. It will further be appreciated that nomenclature other than that specifically used herein to describe the handling of computer tasks by a computer system may be used in other environments. Therefore, the invention should not be limited to the particular nomenclature used herein, e.g., as to protocols, requests, writing, reading, deleting, jobs, objects, etc.

Figure 2:
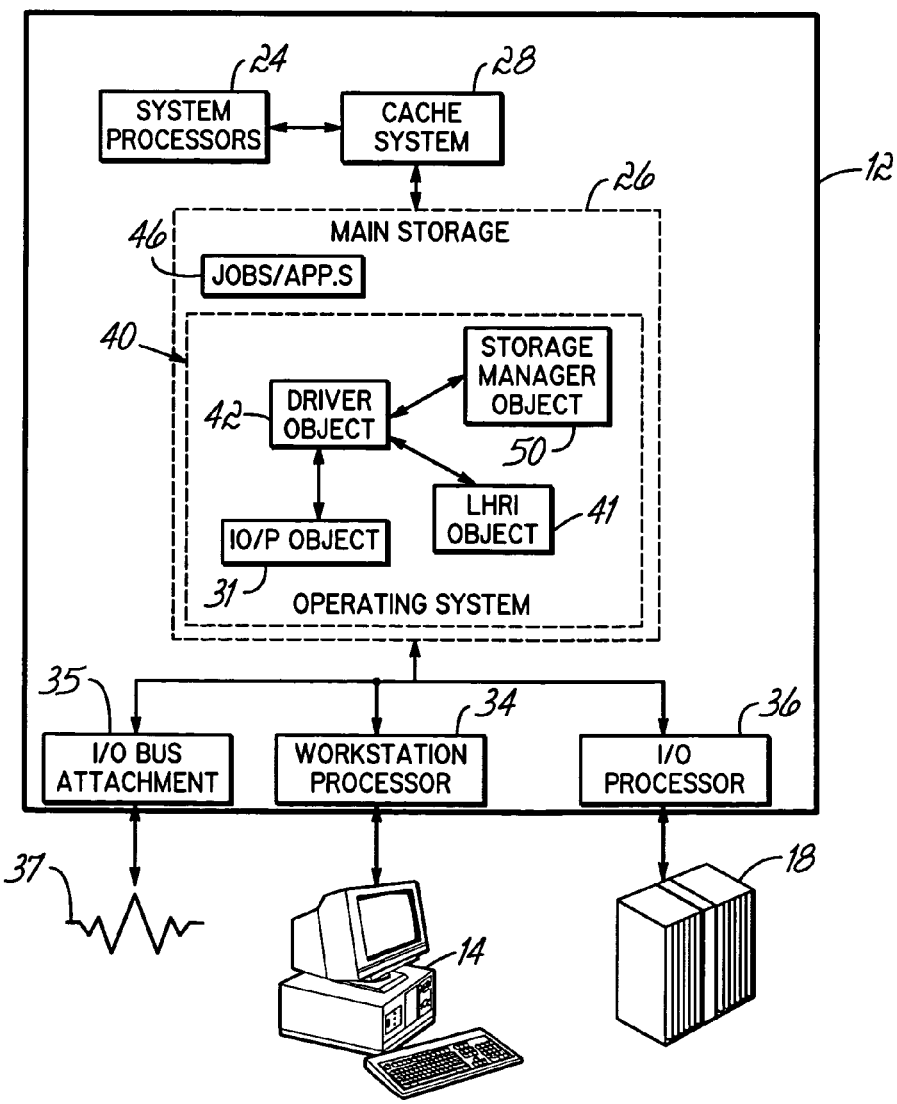
FIG. 2 is a block diagram of a computer in the system of FIG. 1.

FIG. 2 shows an exemplary hardware configuration of the computer 12 of FIG. 1 configured to manage one or more physical connections to a peripheral device 18. Computer 12 generically represents, for example, any of a number of multi-user computers such as a network server, a midrange computer, a mainframe computer, etc. As such, the terms "node," "system" and "computer" are sometimes used interchangeably throughout this specification. In any case, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Computer 12 generally includes one or more system processors 24 coupled to a main storage 26 through one or more levels of cache memory disposed within a cache system 28. Furthermore, main storage 26 is coupled to a number of types of external devices via a system input/output (I/O) bus 35 and a plurality of interface devices, e.g., a workstation controller 34 and an I/O Processor 36, which respectively provide external access to one or more external networks (e.g., a cluster network interconnection), one or more workstations 14, and/or one or more storage devices, such as a storage server logical unit. Any number of alternate computer architectures may be used.

To implement an apparatus, program product and method for managing connections consistent with the invention, computer 12 is illustrated as having resident in main storage 26 an operating system 40 implementing a plurality of objects 31, 41, 42 and 50 for managing connections to a peripheral devices 18. Objects comprise both data structures and operations, known collectively as methods. Methods access and manipulate data structures. Objects having identical data structures and common behavior can be grouped together into classes. Object structures include data and pointer fields. Pointers contain the addresses of other memory locations. Data fields embody information or other objects. While shown in the illustrated embodiments as an object, the multipath driver, device driver, and all other software components consistent with the invention are not limited to consisting of objects in other embodiments.

As shown in FIG. 2, some of the objects 31, 41 and 42 of the operating system 40 may correspond to physical components of the computer 12 and/or computer system 10. For instance, the IOP 31 may correspond to I/O processor 36, which along with an adapter (not shown), communicates with the peripheral device 18. As such, the IOP 31 includes methods to access and manipulate the I/O processor 36. That is, the IOP 41 initiates processes associated with accessing the peripheral device 18 using the I/O processor 36. Similarly, the device driver 42 may correspond to, on a one-to-one basis, a physical connection in communication with peripheral device 18. The device driver 42 thus functions as a logical structure through which the operating system 40 manipulates information and processes associated with the respective cable connection. As shown in FIG. 2, the computer 12 thus has only one physical connection associated with the peripheral device 18.

The storage manager 50 includes and otherwise communicates with other upper level programs responsible for managing disk assignments. That is, the storage management 50 is configured to assign, read and write commands and other data to disk units and other peripheral devices 18.

In the single connection scenario of FIG. 2, the storage manager 50 sends and receives information to and from a device driver 42. The device driver 42 functions, in part, as an interface between the IOP 31 and the storage manager 50. For instance, the device driver 42 may read from the peripheral device 18 prior to its communication to the storage manager 50. Such data includes one or more identifiers associated with respective peripheral units, e.g., disk units. The storage manager 50 may use this identifier information when determining read/write assignments, for example.

As is known in the art, the device driver 42 may additionally interface with a Logical Hardware Resource Information (LHRI) 41. The LHRI 41 addresses and processes user and system input to ensure, in one respect, consistent naming conventions between computers and systems. The LHRI 41 may additionally correspond to a physical HRI interface for receiving user input. As discussed below in greater detail, such input may include specifying removal of a connection from association with a peripheral device 18.

One or more jobs or applications 46 are also illustrated in computer 12, each having access to the objects 31, 41, 42 and 50 and other features implemented within the operating system 40. It will be appreciated, however, that the functionality or features described herein may be implemented in other layers of software in computer 12, and that the functionality may be allocated among other programs, methods, computers or components in clustered computer system 10. Therefore, the invention is not limited to the specific software implementation described herein.

Figure 3:
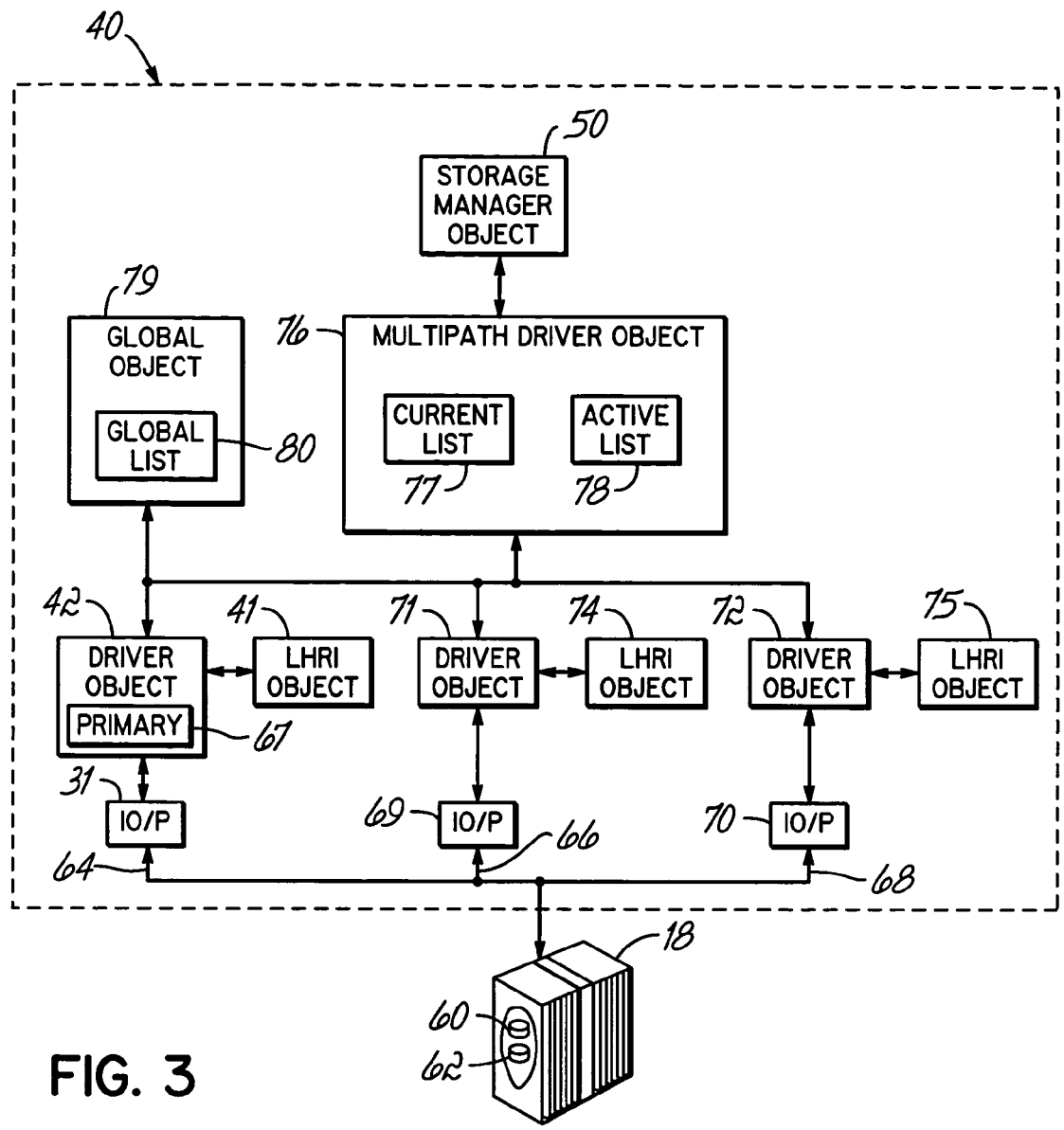
FIG. 3 is a block diagram of the operating system of FIG. 2 after a new connection is added.

The connection between the I/O processor 36 and the peripheral unit 18 of FIG. 2 may comprise one or more connections, such as the fiber optic cable shown in FIG. 1. The exemplary objects 31, 41 and 42 may each be particular to a single connection. As shown in FIG. 3, new such objects may be created for each additional connection added or otherwise associated with the same disk unit.

More particularly, FIG. 3 shows the operating system 40 of the computer 12 of FIG. 2 with a plurality of connections to a single disk unit 60. In one sense, FIG. 3 illustrates the operating system 40 of FIG. 2 after two additional connections between the computer 12 and disk unit 60 are added. New connections 66 and 68 may be created when new cables are installed between the computer 12 and the same disk unit 60. As such, the disk unit 60 of FIG. 3 connects to the computer 12 with three connections that are logically represented by branching lines 64, 66 and 68.

As shown in FIG. 3, the addition of each connection may prompt the creation of a new device driver, IOP and LHRI within the operating system 40 for each connection. As such, each device driver 42, 71 and 72 of operating system 40 may associate with a respective, physical connection 64, 66 and 68. Each device driver thus functions as a logical structure through which the operating system 40 manipulates information and processes associated with the respective cable connection. For reasons discussed in detail below, the device driver 42 associated with the first connection 64 to the disk unit 60 may include a primary flag 67 or other designator. Such a primary designator in the device driver 42 may assist with associating subsequently installed connections with the primary device driver 42 and the disk unit 60.

Each connection 64, 66 and 68 has a respective IOP 41, 69 and 70. However, one skilled will appreciate that suitable IOP's may be associated with more than one connection. These IOP's 41, 69 and 70 communicate information particular to the disk unit 60 and the connections 64, 66 and 68. The IOP's 41, 69 and 70 may pass such information to a respective device driver 42, 71 72. Thus, each connection 64, 66 and 68 associates with its own device driver 42, 71 and 72, respectively. In this manner, the operating system 40 of FIG. 3 maintains an individual device driver 42, 71 and 72 for each connection 64, 66 and 68. This enables individual tracking of connection status and other characteristics, such as a connection's operability and connection information.

Each device driver 42, 71 and 72 further includes identifying information particular to the disk unit 60. LHRI's 73, 74 and 75 are additionally created for each connection 64, 66 and 68, respectively. The LHRI's 73, 74 and 75 maintain consistent naming between the connections 64, 66 and 68 and the disk unit 60, as well as provide an interface mechanism for a user to address a particular connection. As discussed below in detail, for instance, an LHRI may be used to delete connection data from a disk unit.

The information pertaining to the respective connection and the disk unit for each device driver 42, 71 and 72 may ultimately be communicated to a multipath driver 76. The multipath driver 76 may be created in response to the operating system 40 determining that more than one connections form a communication path between the host computer 12 and the disk unit 60. For instance, the primary device driver 42 may create the multipath driver 76 in response to a prompt from a new device driver 71. The new device driver 71 is associated with a new connection 66 to the same disk unit 60.

In one sense, the multipath driver 76 comprises a logical interface layer between the upper level programming/storage manager 50 and logic associated with each connection. That is, the multipath driver 76 comprises a new layer between the device drivers 42, 69 and 70 that preserves the "one device" interface for current hardware and software implementations, while at the same time providing an interface that maintains information specific to the individual connections 64, 66 and 68 to the disk unit 60. The multipath driver 76 thus presents one "view" of a peripheral device/disk unit 60, no matter how many connections there are to the disk unit 60. This allows the upper level programming and storage manager 50 to accomplish functions such as read, write, reset, read-parameters, etc., while focusing only on the disk unit 60 that the multipath driver 76 provides.

Because multiple connections are correlated to a single disk unit 60, they may be treated by the storage manager 50 as one entity. This ensures that connections to a disk unit are not excluded and that two connections for two different disk units are not mistakenly associated together. This mitigates the occurrence of data corruption.

To this end, the multipath driver 76 may compile a complete connection list 77. The complete connection list may comprise information relating to each device driver 42, 71 and 72. For instance, the multipath driver 76 may compile the complete list 77 having pointers to the type/level/serial number field of each device driver associated with a given connection. Such information may be recorded in the complete list 77 whenever a connection becomes operable or a new disk unit is added, for instance. The complete connection list 77 is made available to the upper level programming/storage manager 50.

The multipath driver 76 may also include an active connection list 78. The active list 78 may include pointers to the object fields of those device drivers that are available or otherwise desirable. For example, an exemplary active list may include pointers to device drivers 42 and 72, but not to device driver 71, whose associated cable connection 66 has been disconnected for maintenance, for example.

Moreover, the more concise list reduces processing time and power needed to locate an appropriate connection. The multipath device 76 additionally handles connection failures by removing the failed connection 71 from the active list provided to the storage manager 50. The multipath device 76 additionally finds an alternative connection 64 and/or 68 to the disk unit 60 in response to the failed connection 66.

At the same time, the multipath driver 76 can pass pertinent information, such that contained in the complete list 77, up to the storage manager 50. The storage manager 50 may send down read/write commands to the multipath driver 76. The multipath driver 76 in turn acts as an interface to coordinate and manage where the write/read commands should be routed in order to reach their target. That is, the multipath driver 76 may use the active connection list 78 to determine which connection(s) 64, 66 and/or 68 should be used. As discussed herein, the determination made by the multipath driver 76 may include load balancing and other considerations, besides whether a given connection is active.

For exemplary purposes, FIG. 3 includes only one multipath driver 76, and accordingly, device drivers 42, 71 and 72 are associated with only one disk unit 60. One skilled in the art, however, will appreciate that the operating system 40 may include a number of additional multipath drivers as needed to manage connections of additional disk units.

All communications for this particular disk unit 60 flow through one multipath driver 76 of FIG. 2. When there are multiple connections, each connection is associated with a device driver, a resource name and the same disk unit 60. The multipath driver 76 manages all of the objects. The storage manager 50 and other upper level programming remains unburdened by how many actual connections there are. Also, additional connections may be added "on the fly" without requiring any shutdown/quiesce, etc.

Each disk unit 60, 62 of the peripheral device 18 includes a unique identifier string, such as an identifier string set by the storage server logical unit's manufacturer. The string can be read and is usually not changed by the system 10. The peripheral device 18 also includes a page having connection information. The connection information is used by the operating system 40 to keep track of disk units so that the same resource names are assigned to each disk unit and connection for each Initial Program Load (IPL). The disk unit 60 records the connection information pertaining to the connection 22 onto the page of the disk unit when the connection is initially coupled to the disk unit 60. As discussed in detail below, such information may be updated when a user removes a connection using the LHRI.

A global device 79 of the operating system 40 of FIG. 3 may maintain a global list 80 of registration information. The registration information of the global list 80 may pertain to all connections registering on the computer 12. This registration information may differ from that included within the current connection list 77 of the multipath driver 76. Namely, the pointer information of the current list 77 pertains to just those connections associated with a single disk unit 60. The global list 80 may alternatively include pointers to all connections that have been registered in association with the computer 12.

Registration information accessible to or otherwise included within the global list 80 includes type/level/serial number information that is communicated when a connection is activated or during an IPL, for instance. As discussed below, this global list 80 provides a mechanism to associate connections to the same disk unit with a primary disk unit for management considerations. The global list 80 may also be used to determine alternative routes that are useful when removing a connection.

The discussion hereinafter will focus on the specific routines utilized to manage connections in a manner consistent with the present invention. The routines executed to implement the embodiments of the invention, whether implemented as part of an operating system or a specific application, component, program, object, module or sequence of instructions, will also be referred to herein as "computer programs," "program code," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

It will be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Moreover, those skilled in the art will recognize that the exemplary environments illustrated in FIGS. 1–3 are not intended to limit the present invention. Indeed, those skilled in the art will recognize that other alternative hardware and/or software environments may be used without departing from the scope of the invention.

Figure 4:
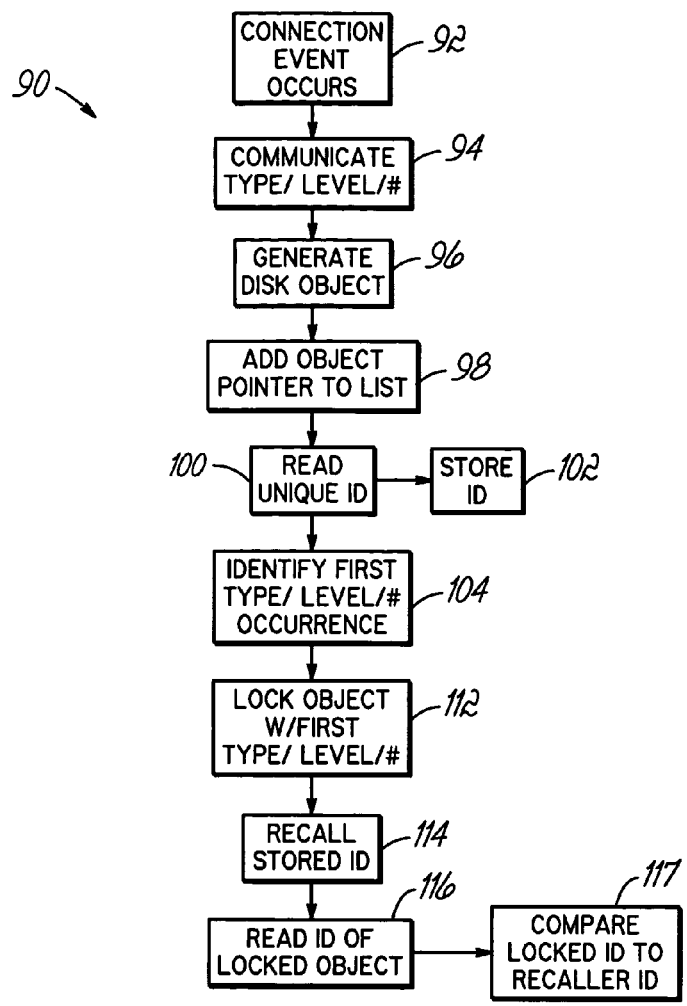
FIG. 4 is a flowchart illustrating an exemplary routine for locating a primary associated with a disk unit in the computer system of FIG. 1.

FIG. 4 shows a sequence of steps that are executable by the hardware and software environments of FIGS. 1–3. More particularly, the exemplary steps of the flowchart 90 of FIG. 4 are configured to determine, in part, a candidate for a primary connection. That is, the processes of the flowchart 90 are generally directed to locating a primary connection to a disk unit. All other connections to the same disk unit may then be associated with this primary connection for the purposes of organizing and managing appropriate connections according to their common disk unit.

At block 92 of FIG. 4, a connection event occurs. A typical connection event may include a computer 12 powering up with connected disk units, a cable being plugged into a port or switch, and/or a new disk unit being configured. Type/level/serial number information pertinent to the connection undergoing the event at block 92 is reported at block 94 of FIG. 4. Such type/level/serial number information is commonly included within hardware devices by manufacturers for identification purposes. As such, the IOP 69 may retrieve the type/level/serial number information from the disk unit 60 via the physical connection 66.

The IOP 69 may then initiate generation of a device driver 71 at block 96. The device driver 71 is thus generated in association with the IOP 69. That IOP 69 is in turn associated with the connection 66 and disk unit 60. The newly created device driver 71 may thus include access to the type/level/serial number retrieved at block 94.

A pointer containing the address of the newly generated object is then added to the global list 80 at block 98. Where so configured, the global list 80 may include pointers to previously generated objects. These objects may or may not be associated with the same disk unit 60.

At block 100, the device driver 71 causes a unique ID to be read off of a page of the disk unit 60 by the IOP 69. This unique ID may be stored at block 102 of the flowchart 90.

Unlike the type/level/serial number information retrieved by the IOP 69 at block 94, the unique ID at block 100 is particular to a single disk unit 60. That is, no two disk units share the same unique ID. As such, these two types of identifying information thus provide different levels of granularity as to the specificity of identifying a given disk unit.

As will be clear after a full reading of the specification, an embodiment consistent with the invention capitalizes on these differing levels of granularity to first locate a device driver in the global list 80 that has the same type/level/serial number as that read at block 94. As described in detail below in connection with FIG. 5, locating this first object assists in searching for a primary connection without unduly slowing other processes. To this end, the new device driver 71 searches the global list 80 at block 104 for type/level/serial number data that matches the data retrieved at block 94. As the type/level/serial number data is readily available, this portion of locating a primary connection is accomplished quickly with relatively few processing and memory requirements.

The first identified device driver 42 having the type/level/serial number is locked at block 112 of FIG. 4. Of note, there has to be at least one such object having the matching type/level/serial number by virtue of the searching device driver 71, itself, which was added to the global list 80 at block 98. The lock of block 112 allows the located device driver 42 to continue to search the global list 80 while all other objects having the same type/level/serial number are effectively held, or kept inactive by the operating system 40. That is, the other device driver objects in the global list 80 that have the same type/level/serial number are not allowed to search until the lock is lifted off of the first located device driver 42. This precaution prevents subsequently registered objects in the global list 80 from simultaneously searching for a primary connection. Such simultaneous searching could erroneously result in determining more than one primary connection, which could lead to dissociation and data loss.

In one embodiment, the lock's hold only applies to those device drivers on the global list 80 that have the sought after type/level/serial number. Because only those objects having the same type/level/serial number are held inactive, other methods on the list are able to search concurrently for other type/level/serial number objects associated with other disk units. This feature allows good efficiency by enabling parallel processing.

While other objects having the same type/level/serial number remain inactive, the first located device driver 42 sequentially reads the unique identifiers of the locked objects at block 116. The device driver 42 having the lock then compares at block 117 the read unique identifier to the stored unique identifier recalled at block 114. That is, the locked device driver 42 may evaluate other device drivers on the list to find a matching unique ID. This unique ID is used to confirm that a particular device driver is with certainty associated with the same disk unit 60.

Figure 5:
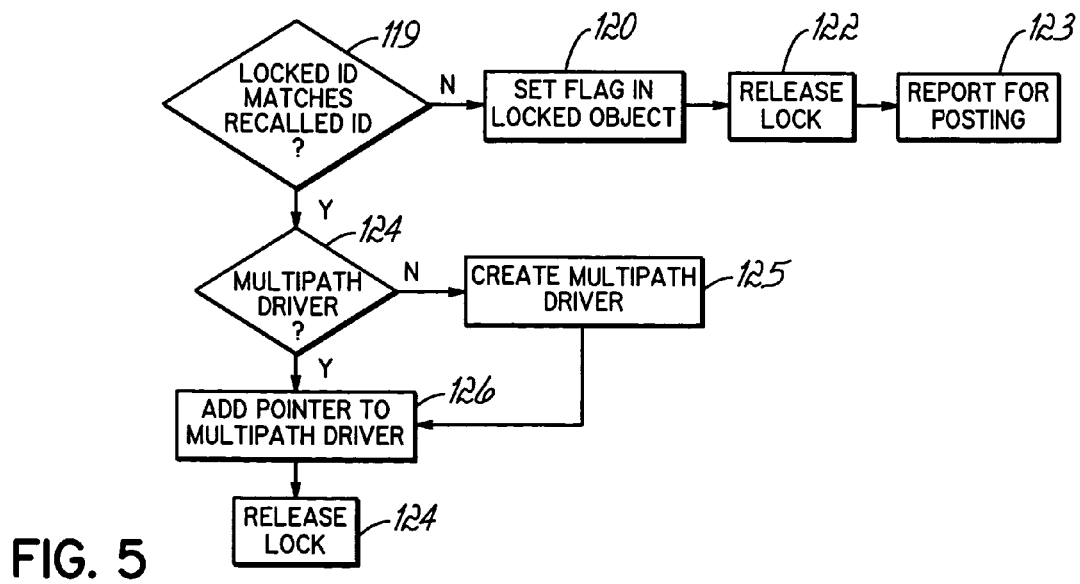
FIG. 5 shows a series of exemplary steps configured to associate a new device driver with a primary located in FIG. 4.

The flowchart 118 of FIG. 5 shows a series of exemplary steps configured to associate the new device driver 71 with the primary located in FIG. 4. Turning more particularly to the processes of FIG. 5, the locked device driver 42 compares its own unique ID to the recalled ID of the newly created device driver 71 (which was stored at block 102 of FIG. 4). Where no unique ID associated with any device driver in the global list 80 matches the recalled ID at block 119 of FIG. 5, then a flag 67 is set in the locked 42 at block 120. This flag 67 designates the locked 42 as being a primary for a given disk unit 60. Consequently, all subsequent connections added to the global list 80 may locate and be associated with the primary.

As discussed above, the first device driver 42 located in FIG. 4 may be the same device driver 71 that was generated at block 96 of FIG. 4. Such a circumstance occurs where the device driver generated at block 96 is the first to be added to the list. As discussed herein, such will be the case where that newly created object is to be designated as a primary device driver for a given disk unit.

At block 122 of FIG. 5, the lock is released on the primary device driver 42. The primary 42 then may report itself for posting to the storage manager 50 or other upper level program at block 123.

Where the unique identifier of the locked object 42 alternatively matches the recalled unique identifier of the newly created device driver 71 at block 119 of FIG. 5, then the new object 71 may be associated with the locked object, or primary device driver 42. More particularly, the new device driver 71 prompts the primary 42 to see if there is already a multipath driver 76 associated with the primary 42 (and disk unit 60). If not, the primary device driver 42 creates the multipath driver 76 at block 126 of FIG. 5. In any case, a pointer to the new, subordinate device driver 71 is added to the multipath driver 76 at block 128.

In this manner, the multipath driver 76 develops arrays comprising the current and active connection lists 77 and 78, respectively. These lists in part correlate the new device driver 71 to the primary device driver 42, both of which are associated with the disk unit 60. The multipath driver 76 may update both the current connection list 77 and the active connection list 78 according to the status of the connections.

Figure 6:
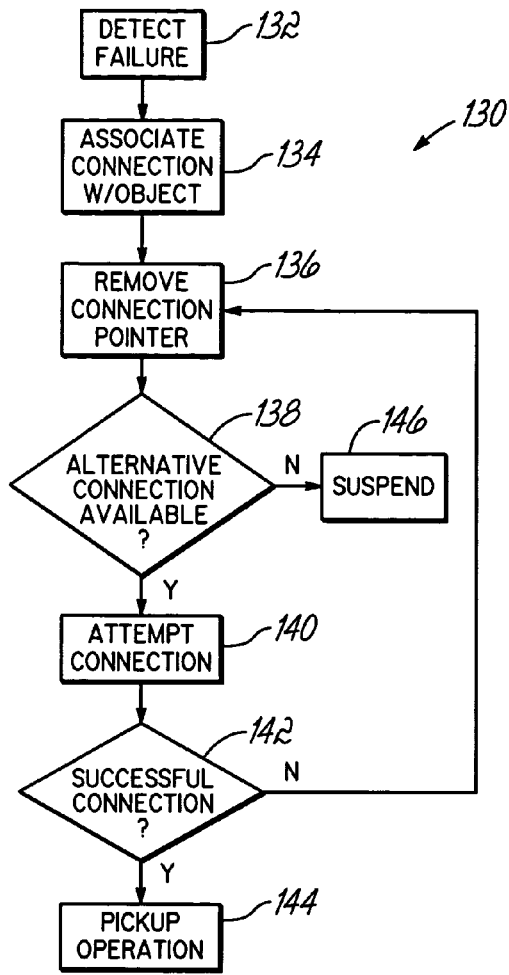
FIG. 6 is a flowchart illustrating an exemplary routine performed by the multipath driver of FIG. 3 for sequencing to another connection in response to a failed connection.

The flowchart 130 of FIG. 6 shows one such exemplary sequence of steps suited to update the active connection list 78. More particularly, the steps of the flowchart 130 update and use the active connection list 78 to transparently transition to an alternative connection in the event a connection 66 becomes inoperable. For instance, the device driver 71 may communicate notice of a connection failure to the multipath driver 76 at block 132 of FIG. 6.

In response to the failure, the multipath driver 76 determines which device driver 71 is associated with the failed connection 66 at block 134. For instance, the multipath driver 76 may read a pointer included the notice to the failed device driver. The multipath driver 76 may then remove the pointer to the connection from the active connection list 78 at block 136. This removal from the active connection list 78 ensures that the multipath driver 76 does not attempt to route data over the failed connection 66 again, or at least until the connection 66 is reestablished according to the connection processes of FIG. 4.

Where the active list 78 at block 138 indicates that the multipath driver 76 has multiple, alternative connections to the disk unit 60 at its disposal, the multipath driver 76 may sequence down the list 78 to route data over a working connection 68. Of note, the transition to this new connection 68 is accomplished seamlessly, or without any discernable delay. Thus, computing operations remain uninterrupted in spite of the failed connection 66.

To this end, the multipath driver 76 attempts routing data to the alternative connection 68 using a pointer to the appropriate device driver 72 associated with the connection 68. Where the communication succeeds at block 142, then operations seamlessly continue at block 144. Any subsequently discovered failed connection will be removed from the active list 78 at block 136 of FIG. 6. As such, a failed connection is only tried once, and the system 10 avoids unproductively cycling between failed connections. That is, each connection in the active list 78 is only tried once, and the maximum number of retries equals the number of connections in the list 78. Only where an alternative connection cannot be determined at block 138 of FIG. 6 will operations be suspended at block 146.

These features of the list 78 and multipath driver 76 thus avoid having to check the status of each device driver when determining a new route. All objects included in the active list should be active as of the last update. These features also ensure an optimum number of retries and that all possible paths are tried.

Figure 7:
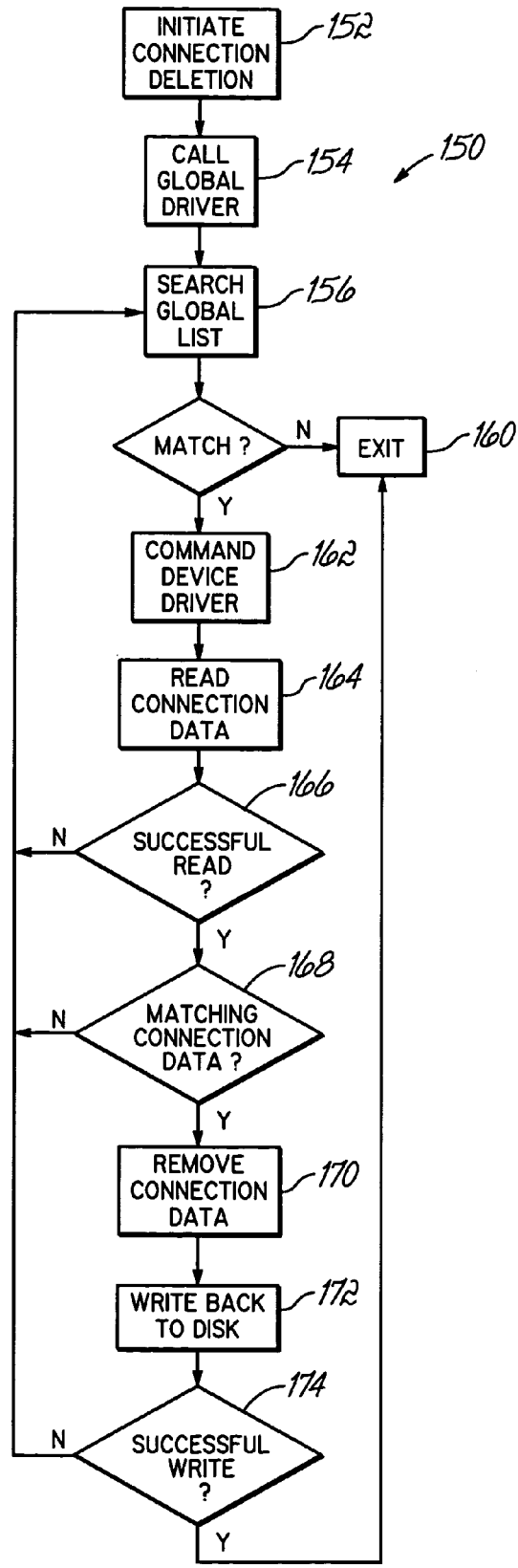
FIG. 7 is a flowchart illustrating an exemplary routine for disassociating a connection from a disk unit in the computer system of FIG. 1.

Minimizing memory requirements is also a benefit realized by the processes of the flowchart 150 shown in FIG. 7. More particularly, the exemplary steps of the flowchart 150 update connection information stored on a peripheral device/disk unit 60. In addition to reducing memory usage, the removal of connection information from the disk unit as discussed below facilitates processing of current connection information.

Disk units include a limited space for storing connection information. Connection information includes an identifier sequence particular to the connection(s) that couple the disk unit to the computer. For instance, a readable and writeable page of data stored on the disk unit may include character strings associated with each connection coupled to the disk unit. As more connections are added, this storage space may fill up. Consequently, a feature of the present invention provides a mechanism for deleting erroneous or outdated connection information on each disk unit.

Turning particularly to block 152 of FIG. 7, a user may input a command into the computer 12 to delete a failed, or non-reporting connection. In response, the operating system 40 of the computer 12 may automatically initiate processes to remove connection information from the disk unit 60. For instance, an LHRI 74 associated with the device driver 71 of the non-reporting connection 66 may prompt at block 154 the global driver 79 to locate a working connection that is coupled to the disk unit 60. That is, the LHRI 74 initiates processes to automatically find an alternative path, other than the non-reporting connection, to the same disk unit 60 that was formerly in active communication with the non-reporting connection.

To this end, the global driver 79 at block 156 searches the global list 80 for type/level/serial number information associated with the disk unit 60. Should a match of the information be found, the global driver 79 prompts the device driver 72 associated with the applicable pointer in the list 80 to read connection data off of the disk unit 60 at block 164. A successful read of such data at block 166 may automatically initiate an evaluation of the connection data of the disk unit 60. Where the data cannot be read or the connection data does not match, the search for an alternative connection may continue at block 156.

Alternatively, where a working connection to the disk unit 60 has been located and confirmed at block 168, then the device driver 72 may cause the connection data on the disk unit 60 to be removed using the IOP 70 at block 170. This connection data is then rewritten by the device driver 72 such that it contains no reference to the non-reporting connection. Once thus updated, the device driver 72 writes the updated connection information back to the disk unit 60 at block 174. A successful update at block 174 ends the updating sequence at block 160.

In this manner, disk storage space may is preserved for accurate connection information and other uses. Moreover, the updated connection information may be used to verify connectivity upon IPL or installation, for instance. Under one such scenario, connection information from a disk unit may show a multipath driver that data pertaining to four different cables is resident within the disk unit storage. The multipath driver may use the active connection list 78 to verify that four connections are currently useable. A discrepancy may cause a check to be performed on objects associated with one or more of the connections to verify that they are still operating as reported.

While the present invention has been illustrated by a description of various embodiments, and while these embodiments have been described in considerable detail, it is not the intention of the applicants to restrict, or in any way limit, the scope of the appended claims to such detail. For instance, any of the steps of the above exemplary flowcharts may be deleted, augmented, made to be simultaneous with another or be otherwise altered in accordance with the principles of the present invention.

Furthermore, while computer systems consistent with the principles of the present invention may include virtually any number of networked computers, and while communication between those computers in the context of the present invention may be facilitated by an entitlement application, one skilled in the art will nonetheless appreciate that the processes of the present invention may also apply to direct communication between two computers as in the above example, or even to the internal processes of a single computer. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An apparatus comprising:
    a processor; and
    a multipath device driver configured to execute on the processor and to manage a plurality of physical connections to a peripheral device, the multipath device driver providing a logical connection interface configured to provide client access to the peripheral device over at least one of the plurality of physical connections.

2. The apparatus of claim 1, wherein multipath device driver includes a device driver for each of the plurality of physical connections, and coupled to the multipath device driver.

3. The apparatus of claim 1, wherein the multipath device driver is configured to manage a list including the plurality of physical connections.

4. The apparatus of claim 3, wherein the multipath device driver is further configured to manage a second list including information pertaining to active connections of the plurality of physical connections.

5. The apparatus of claim 4, wherein the second list includes information pertaining to a status of each of the plurality of connections.

6. The apparatus of claim 1, wherein the multipath device driver initiates determining an alternative connection in response to a failed connection.

7. The apparatus of claim 6, wherein the multipath device driver determines the alternative connection by accessing a list of alternative connections.

8. The apparatus of claim 1, wherein the multipath device driver initiates deleting connection data from the peripheral device.

9. The apparatus of claim 1, wherein the multipath device driver initiates deleting the connection data by communicating with the peripheral device over another of the plurality of connections.

10. The apparatus of claim 1, wherein the multipath device driver initiates writing connection data to the peripheral device.

11. The apparatus of claim 1, wherein the multipath device driver initiates associating a first device driver with a second device driver.

12. The apparatus of claim 1, wherein the multipath device driver initiates searching a list for an identifier indicative of the peripheral device to determine a primary connection.

13. The apparatus of claim 1, wherein the multipath device driver initiates placing a lock on a device driver to prevent another device driver from searching a list.

14. The apparatus of claim 1, wherein the multipath device driver initiates designating a connection as a primary connection.

15. The apparatus of claim 1, wherein the multipath device driver is created by a primary device driver.

16. The apparatus of claim 15, wherein the primary device driver creates the multipath device driver in response to detecting a new connection associated with the peripheral device.

17. An apparatus comprising:
    a processor; and
    a device driver executing on the processor and configured to manage a plurality of physical connections to a peripheral device, the device driver providing a logical connection interface configured to create a list including data associated with at least one active connection of a plurality of connections connecting a computer to the peripheral device, and to use the list to automatically route communications from the computer to the peripheral device.

18. The apparatus of claim 17, wherein the device driver is configured to use the list to route the communications to a second connection on the list in the event that a first connection fails.

19. The apparatus of claim 17, wherein the device driver is configured to remove the data associated with the at least one active connection from the list in response to the at least one active connection failing.

20. The apparatus of claim 17, wherein the device driver is configured to create a second list including information pertaining to all of the plurality of connections.

21. An apparatus comprising:
    a processor; and
    a multipath device driver executing on the processor and configured to manage a plurality of physical connections to a peripheral device, the multipath device driver providing a logical connection interface configured to receive input associated with removing from memory of the peripheral device information pertaining to an undesired connection of the plurality of connections connecting a computer to the peripheral device, and to remove the information from the peripheral device.

22. The apparatus of claim 21, wherein the multipath device driver is further configured to determine an alternative connection in communication with the peripheral device.

23. The apparatus of claim 21, wherein the multipath device driver is further configured to remove the information from the peripheral device using the alternative connection in communication with the peripheral device.

24. A method for managing a plurality of physical connections from a computer to a peripheral device, the method comprising:

creating a multipath device driver comprising a logical connection to a peripheral device coupled to a computer over a plurality of physical connections; and accessing the peripheral device using the multipath device driver.

25. The method of claim 24, further comprising adding a new device driver associated with the multipath device driver in response to detecting a new connection between the peripheral device and the computer.

26. The method of claim 24, wherein accessing the peripheral device using the multipath device driver further includes accessing a memory.

27. The method of claim 24, wherein accessing the peripheral device using the multipath device driver further includes determining an alternative connection to the peripheral device in response to detecting a failed connection.

28. The apparatus of claim 27, determining an alternative connection to the peripheral device in response to detecting a failed connection further includes accessing a list of active connections.

29. The method of claim 24, wherein accessing the peripheral device over the multipath device driver further includes deleting connection data from the peripheral device.

30. The method of claim 29, wherein deleting connection data from the peripheral device further includes communicating with the peripheral device over another of the plurality of connections.

31. The method of claim 24, wherein accessing the peripheral device over the multipath device driver further includes writing connection data to the peripheral device.

32. The method of claim 24, wherein creating the multipath device driver further includes associating a new device driver with a primary device driver, wherein the primary device driver is associated with the multipath device driver.

33. The method of claim 24, wherein creating the multipath device driver further includes updating a list including active connections to the peripheral device.

34. The method of claim 24, wherein creating the multipath device driver further includes updating a list including status information pertaining to the plurality of connections.

35. The method of claim 24, wherein creating the multipath device driver further includes searching a list for an identifier associated with the peripheral device.

36. The method of claim 24, wherein creating the multipath device driver further includes placing a lock on an object to prevent the object from searching a list.

37. The method of claim 24, wherein creating the multipath device driver further includes reading identification data from the peripheral device to confirm an identity of a connection.

38. The method of claim 24, wherein creating the multipath device driver further includes creating a multipath driver in response to detecting a new connection associated with a different peripheral device.

39. The method of claim 24, wherein creating the multipath device driver further includes creating the multipath device driver using a primary device driver.

40. The apparatus of claim 37, wherein creating the multipath device driver further includes creating the multipath device driver in response to detecting a new connection associated the peripheral device.

41. The apparatus of claim 37, wherein creating the multipath device driver further includes using a new device driver associated with a new connection to prompt a primary device driver to create the multipath device driver, wherein the multipath device is associated with both the primary and new device drivers.

42. A method for managing a plurality of physical connections from a computer to a peripheral device, the method comprising:

creating a list including data associated with at least one active connection of a plurality of connections connecting a computer to a peripheral device; and using the list to automatically route communications from the computer to the peripheral device.

43. The method of claim 42, wherein using the list further includes using the list to route the communications to a second connection in the event that the at least one active connection fails.

44. The method of claim 42, further comprising removing the data associated with the at least one active connection in response to the at least one active connection failing.

45. The method of claim 42, further comprising creating a list including information pertaining to all of the plurality of connections.

46. A method for managing a plurality of physical connections from a computer to a peripheral device, the method comprising:

receiving input associated with removing from memory of a peripheral device information pertaining to an undesired connection of a plurality of connections connecting a computer to the peripheral device; and removing the information from the peripheral device.

47. The method of claim 46, wherein removing the information further includes determining an alternative connection in communication with the peripheral device.

48. The method of claim 47, wherein removing the information further includes using the alternative connection in communication with the peripheral device to remove the information from the peripheral device.

49. A program product, comprising:

program code including a device driver configured to manage a plurality of physical connections to a peripheral device, the device driver providing a logical connection interface configured to provide client access to the peripheral device over at least one of the plurality of physical connections; and a physical, recordable medium bearing the program code.

* * * * *